Aug. 5, 1952 R. H. ELLSWORTH 2,605,785
VALVE MEANS FOR CONTROLLING LIQUIDS AND GASES
Filed June 10, 1948 2 SHEETS—SHEET 1
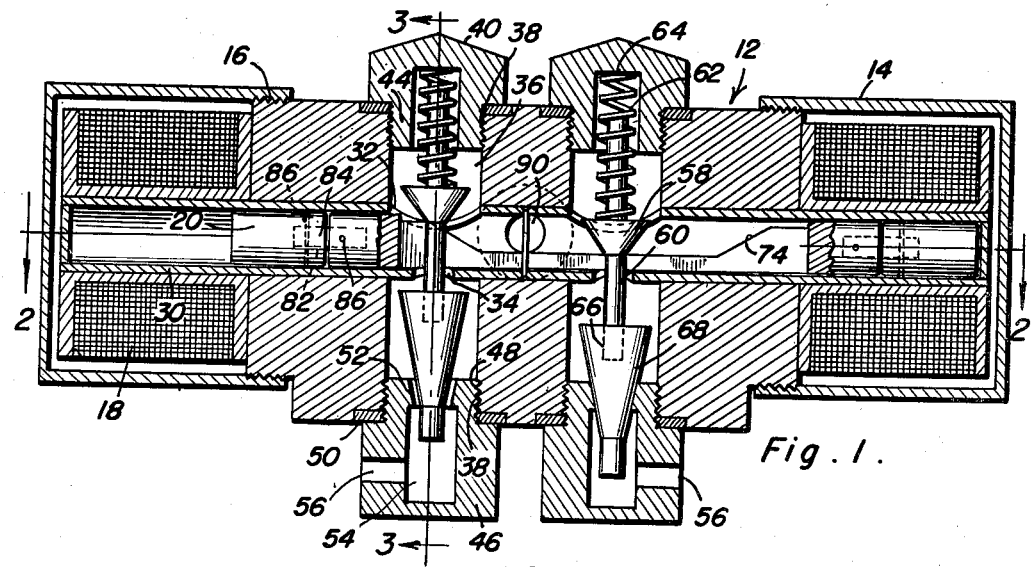
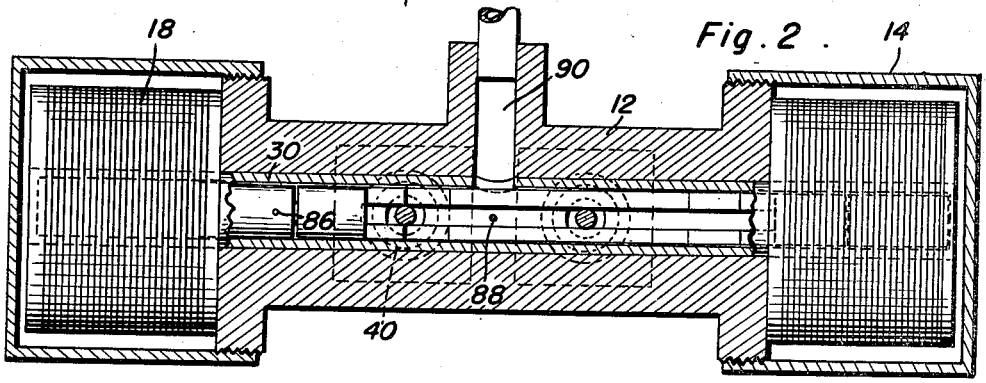
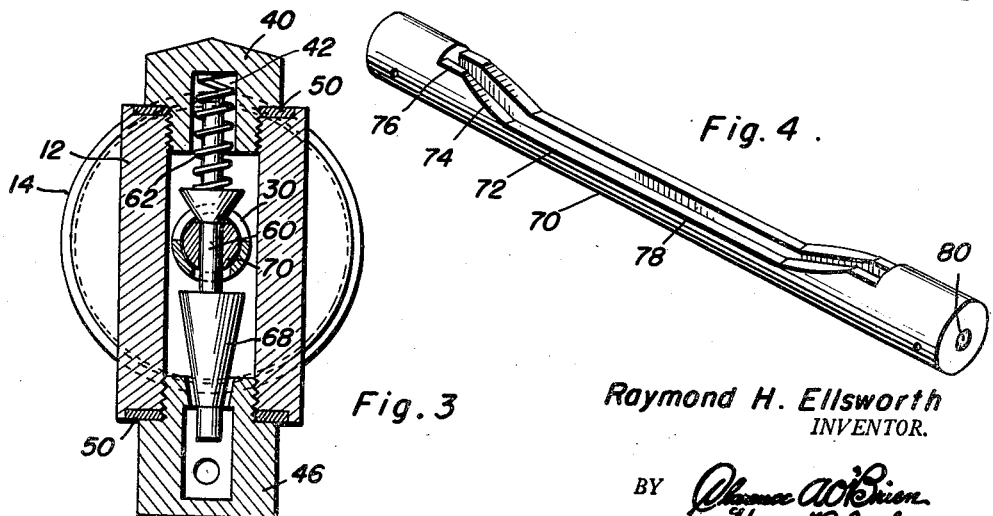
Raymond H. Ellsworth
INVENTOR.
BY *Thomas A. O'Brien*
*and Harvey B. Jackson*
Attorneys Aug. 5, 1952　　　　R. H. ELLSWORTH　　　　2,605,785
VALVE MEANS FOR CONTROLLING LIQUIDS AND GASES
Filed June 10, 1948　　　　　　　　　　　2 SHEETS—SHEET 2
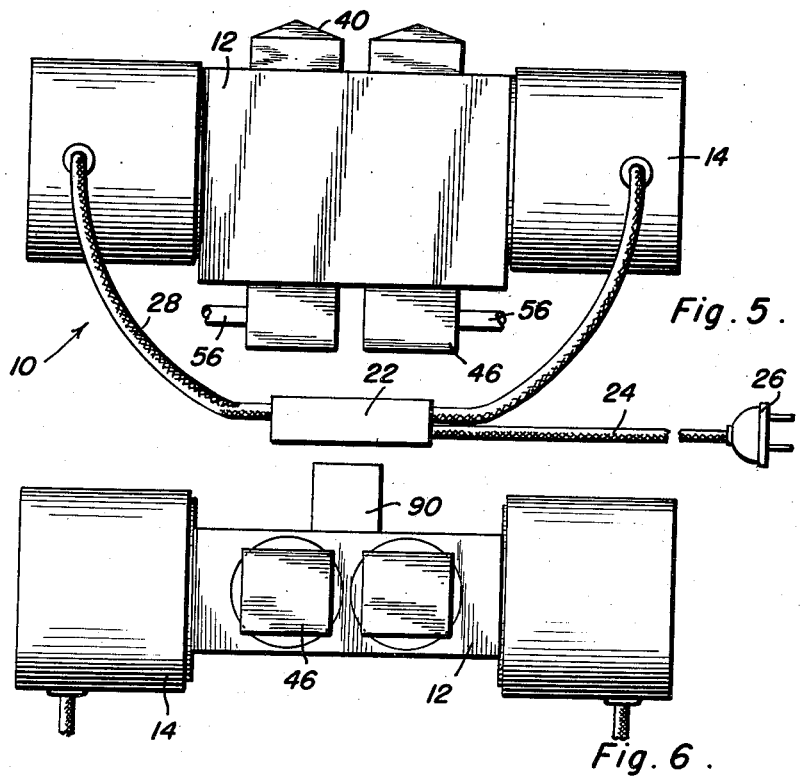
Fig. 5.
Fig. 6.
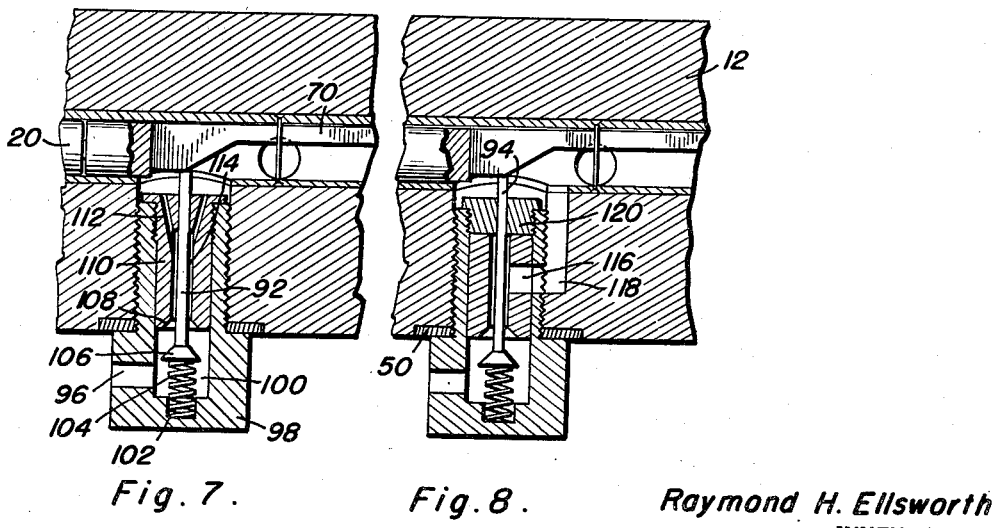
Fig. 7.　　　Fig. 8.
Raymond H. Ellsworth
INVENTOR.
BY Clarence A. O'Brien
and Harvey B. Jacobson
Attorneys Patented Aug. 5, 1952

2,605,785

UNITED STATES PATENT OFFICE 2,605,785

VALVE MEANS FOR CONTROLLING LIQUIDS AND GASES

Raymond H. Ellsworth, West Haven, Conn.

Application June 10, 1948, Serial No. 32,074

1 Claim. (Cl. 137—728)

This invention relates to automatic means whereby the flow of fluid is controlled. The device is adapted for varied uses and will effectively control the flow of gases under pressure, and particularly such gases as are used in refrigerator systems, and a primary object of the invention is to provide an improved electro-magnetic valve that will simultaneously open one port and close another.

Another object of the invention, ancillary to the primary object, is to provide novel means whereby, on actuation, it serves to automatically close one port and prevents further flow of fluids therethrough, while simultaneously opening another port to admit other desired fluids, said means being a single lever unit suitably connected with each port and controlled by the energization of the solenoid effecting this operation, said unit being adapted to retain the ports in any position desired.

And a further object of the invention is to permit substitution of various types of valves and ports without altering in any manner the theory of operation of the invention.

And another object of the invention is to provide an electro-magnetic valve that eliminates unnecessary moving parts and needs little adjustment once the device has been assembled, the entire unit being air-tight in construction.

Other objects of the invention reside in the details of construction and in the combination of the various parts and in their mode of operation, as will hereinafter appear.

The following is a detail description of a preferred embodiment of the invention and is illustrated in the accompanying drawings, wherein:

Figure 1 is a longitudinal sectional view of the invention;

Figure 2 is a horizontal sectional view of the invention and is taken substantially on lines 2—2 of Figure 1;

Figure 3 is a vertical transverse sectional view and is taken substantially on line 3—3 of Figure 1;

Figure 4 is a perspective view of the lever means for controlling the operation of the ports;

Figure 5 is a side elevation of the invention;

Figure 6 is a top plan view of the invention;

Figure 7 is a sectional view of a modification of a valve used in the device; and Figure 8 is a further modification of a valve used in the invention.

Referring to the figures, the fluid control device is indicated generally by Figure 10 and includes a valve body 12 and a dust shield or housing 14 on each end thereof.

Shield 14 is of hollow construction and is internally threaded at the open extremity thereof at 16 to seat upon valve block or housing 12.

The means for energizing the valve control is located wtihin housings 14 and include a solenoid coil 18 adapted to energize an iron plunger 20, in a manner presently to appear. As may be best seen in Figure 5, a temperature control box 22 is diagrammatically depicted and is connected to lead 24 terminating in a plug 26 for connection with a suitable source of electric current. Lead wires 28 are connected with solenoid 18, whereby, upon actuation through control 22, the valves controlling the flow of fluid are operated.

Valve block 12 is axially bored throughout the length thereof and retains therein a copper tube 30 electrically welded thereto, copper tube 30 extending beyond the extremities of valve block 12 and extending into dust shield 14. Copper tube 30 is apertured in the upper surface thereof to provide tapered valve seats 32, and includes smaller apertures 34 directly below apertures 32 to provide horizontal valve seats for a purpose presently to be described.

Valve block 12 is transversely bored, and in the modification shown, at two points thereof, to provide the valve control means of the invention. Bores 36 are in alignment with apertures 32 and 34 of copper tube 30. The inner extremities of bores 36 are threaded at 38. The upper threaded end 38 is adapted to secure cap 40, cap 40 being counterbored axially therein at 42 (Figure 3) and including an externally threaded reduced area shank portion 44. Similarly, bottom cap 46 includes an externally threaded reduced shank portion 48 adapted to be retained on lower threads 38. Lead seal washers 50 are provided for caps 40 and 46, for efficiently sealing the device against escape or ingress of fluids.

Cap 46 includes an inwardly tapered bore 52 axially the length thereof, bore 52 being of relatively short length and continuing as an enlarged inlet bore 54 in connection with lateral fluid inlet 56. Thus, the flow of any fluid, liquid or gas, is adapted, on energization of coil 18, as will presently appear, to start or stop.

Conical shoulder 58, tapered suitably to seat on tapered seat 32, is secured approximately medially the length of spindle 60, spindle 60 extending within bore 42 of cap 40 and retaining thereon coil spring 62. Coil spring 62 is secured between shoulder 64 of cap 40 and the upper end of shoulder 58. Spindle 60 is threaded at the outer extremity thereof at 66 and thereby is secured to clapper 68. Valve 68 is of tapered construction and seats on valve seat 52 when in the position shown in Figure 1.

The means employed for actuating the control valve is illustrated best in Figure 4 and is composed of non-magnetic material, and preferably of bronze. Cam or lever 70 is of rod-like construction and includes a longitudinal, medial, reduced portion 72. An inclined or traveling portion 74 extends on either side of longitudinal section 72 and terminates in a horizontal seat 76. Elongated slot 78 extends through the medial portion of rod 70, to receive spindle 60 therethrough in order to effect operation of the device. Cam lever 70 is bored axially on each end thereof for a short distance therein at 80. Thus, when lever 70 is in position illustrated in Figure 1, bores 80 are aligned with similar bores 82 in iron plunger 20 to receive therein connecting pins 84. Lever 70 and plunger 20 are thus secured together by means of pins 84, pins 84 being retained in position by rivets 86 or other suitable retaining means. A pin 88 (Figure 2) is adapted to retain cam lever 70 in position within valve block 12. A copper tube or service valve connection 90 is tapped into valve block 12, in the manner illustrated in the figures.

If desired, other types of valves may be substituted for that illustrated in Figures 1 through 3. Two such modifications are disclosed in Figures 7 and 8. In Figures 7 and 8, the position of lever 70 is reversed at approximately 180° and the use of conical valve 58 is avoided. In both modifications, valve stems 92 and 94 are adapted to ride on the cam surface of lever 70. In the type of valve shown in Figure 7, inlet 96 is provided laterally of cap 98, cap 98 including an enlarged bore 100, terminating in a reduced spring seat 102. Spring 104 is seated in seat 102 and engages a conical valve 106 to urge it into seating relation with conical seat 108. Seat 108 is machined at one extremity of bushing 110, bushing 110 being threadedly secured within bore 100 of cap 98. The opposite extremity of bushing 110 is drilled to provide a number of evenly spaced outlets 112. Outlets 112 lead into axial bore 114 of bushing 110, bore 114 retaining slidably therethrough valve stem 92. In the modification illustrated, outlets 112 are four in number and are evenly spaced to provide uniform flow of fluid. Of course, any number of outlets may be provided, as is desired. Cap 98 is preferably of copper construction, although other suitable material may be substituted.

Figure 8 is similar in construction to Figure 7, and differs therefrom in that instead of drilled outlets 112, an outlet port 116 is provided in the medial side section of bushing 110, port 116 leading into channel 118 provided in the adjacent end of valve block 12. Packing gland 120 is threaded into the reduced outer extremity of bushing 110 to insure fluid-tight connection, valve stem 94 slidingly extending through bushing 110 and packing 120 in a manner similar to valve stem 92. Of course, other types of valve structure may be supplied, such as valves including sliding sleeves, as well as other inlet means for cap 98.

The use of the device is adapted to any processes where an automatic control of the flow of fluid is desired. For example, the device is well adapted to be used in controlling the flow of hot water. A thermostat is suitably provided in control 22, and when the temperature of the water has dropped below a predetermined minimum, the circuit is closed and solenoid coil 18 is energized, this drawing armature or soft iron plunger 20 therein. Cam 70, by virtue of connection to plunger 20 by means of pin 84, is moved, thereby causing shoulder 58 to travel down incline 74, urged thereon by means of coil spring 62. This action will seat valve 68 on seat 52 to prevent cold water from traveling through port 56 and through outlet 90. Such action of cam 70 simultaneously permits complementary shoulder 58 to ride on incline 74 and seat upon horizontal surface 76. This action, of course, unseats valve 68 and permits hot water to enter similar port 56. When a predetermined temperature is obtained, the control box 22 automatically cuts off the current supplied to solenoid 18, and the process is then reversed. Water, in this manner, is kept at a constant temperature. Current, of course, is supplied to the solenoid only when a change in temperature is prescribed to compensate for undue rise or fall of the temperature of the water.

The device is equally adapted to be used in controlling the flow of gas in a two-stage absorption type refrigeration system that employ heaters or boilers to raise the temperature of the gas, such as methyl chloride, this device controlling the flow of methyl chloride through the boilers and high and low evaporaters. In use, port 90 is the return connection from the low evaporater, inlet 56 illustrated on the left of Figure 1 is the connection to the high boiler, and inlet 56 on the right side of the figure is connected to the low boiler. As the cycle starts, core 20 is pulled toward the left into solenoid coil 18, thereby carrying cam 70 in the same direction, causing shoulder 58 to ride downwardly on cam surface 70, thereby closing left port 56. When this movement has been completed, the control box actuates the heater in the high boiler and methyl chloride is heated to the desired temperature, after which, when this temperature has been obtained, contact is closed through control box 22 or right solenoid coil 18, which in turns pulls the complementary armature 20 toward the right, thereby closing right valve port 56, and enabling the gas to flow from port 90 through left port 56 and the high boiler, through a primary condenser, to the high evaporater, not shown. In this stage of operation, the heater in the low boiler is actuated and the high boiler heater is disconnected. Current is automatically stopped and solenoid coil 18 is de-energized, but the valves 68 remain in position as above explained, and as the temperature rises in the low boiler, pre-set thermostat in the low boiler closes the circuit in the control box and thereby energizes left coil 18. Gas is then circulated through right inlet 56 which in turn permits flow from port 90 to the low boiler and secondary condenser and evaporater unit, as described above. The control box then starts the heater in the high boiler into operation, and when current is removed from left solenoid coil 18, the heater current remains in the high boiler and the low boiler heater is discontinued. In this operation, bi-metal thermostats are not employed, since they do not operate efficiently at temperatures below 5° F. No transformer is employed, as the current is supplied in 110 volts A. C. on the controls. Only in the instance that a room type of thermostat is employed is a 10 volt transformer supplied in conjunction with control 22.

Various types of cams 70 may be substituted for the cam illustrated in Figure 4, such cams depend upon the use to which the device is to be put. It will be noted that copper tube 30 is sealed at each extremity thereof, the only opening therein being for the valve structure and port 90. In certain uses of the device, port 90 may be dispensed with as unnecessary. The device is not limited to any maximum pressure of operation, since the operation thereof is limited only by the structural material employed. Any suitable gases or liquid are adapted to be employed with the device, such gases, in addition to methyl chloride, being sulphur dioxide, Freon, ammonia, steam, and liquids such as water, gasoline, fuel oil, etc. If desired, service plugs may be attached to ports 56, 90, 96, for replacing or bleeding the system connected to the device.

While one complete embodiment has been described in detail, it is to be understood that various features of the invention may be independently used and also that numerous modifications might be made by those skilled in the art, without departure from the spirit and scope of the invention, as indicated above and in the following claim.

Having described the invention, what is claimed as new is:

An automatic fluid control device comprising a valve block having a longitudinal bore therethrough, a hollow housing secured to each end of said block, said block having at least one transverse bore formed therethrough with a valve reciprocably carried therein, said valve including a valve rod having a conical valve head integrally formed at one end thereof, an intermediate portion of said valve rod being formed with a conical cam portion, an elongated rod slidably disposed in said longitudinal bore with its free ends movable into said housings, solenoids in said housings and actuatable for effecting reciprocation of said elongated rod, said elongated rod being formed with a slot through which said valve rod is reciprocably received, the upper surface of the slotted portion of said elongated rod being formed with a camming surface, the conical cam portion of said valve rod being engaged on said camming surface, a valve seat threadedly engaged in said transverse bore and axially aligned with said valve rod whereby said conical valve head can reciprocate into and out of engagement with said valve seat for controlling the flow therethrough.

RAYMOND H. ELLSWORTH.

REFERENCES CITED

The following references are of record in the file of this patent:

UNITED STATES PATENTS

| Number | Name | Date |
|---|---|---|
| 802,945 | Waterman | Oct. 24, 1905 |
| 822,673 | Keller | June 5, 1906 |
| 1,028,657 | Aubert | June 4, 1912 |
| 1,235,980 | Keyes et al. | Aug. 7, 1917 |
| 1,640,537 | Dean | Aug. 30, 1927 |
| 1,819,452 | Wright | Aug. 18, 1931 |
| 1,914,181 | Tabb | June 13, 1933 |
| 2,404,349 | Brant | July 23, 1946 |